United States Patent [19]
Herpich et al.

[11] 3,727,779
[45] Apr. 17, 1973

[54] REAR LOADING REFUSE VEHICLE

[75] Inventors: William A. Herpich; Donal W. Chaney, both of Galion, Ohio

[73] Assignee: Peabody Galion Corporation, Galion, Ohio

[22] Filed: Dec. 6, 1971

[21] Appl. No.: 204,925

[52] U.S. Cl. .................................................214/83.3
[51] Int. Cl. ..............................................B65f 3/00
[58] Field of Search..............................214/503, 83.3

[56] References Cited

UNITED STATES PATENTS

| | | | |
|---|---|---|---|
| 3,402,837 | 9/1968 | Palmer et al. | 214/83.3 |
| 3,662,908 | 5/1972 | Boda | 214/83.3 |

*Primary Examiner*—Albert J. Makay
*Attorney*—Carl F. Schaffer et al.

[57] ABSTRACT

A refuse packing mechanism for the tailgate of a rear loading refuse vehicle is disclosed. A generally L-shaped packer blade is carried at its upper forward end by slide blocks. The blocks are movable back and forth along a generally vertically extending pair of tracks located in the upper forward part of the tailgate. Two similar slide blocks are movable in a similar pair of tracks located rearwardly of the first pair. A thurst link is pivotally connected at one end to each side of the packer blade near its lower trailing edge and at its other end to the slide block on that side of the tailgate. Cylinder and piston mechanisms are connected between the tailgate body and the two pairs of slide blocks for sequentially moving the slide blocks along their tracks for moving the packer blade rearwardly over refuse in the tailgate and forwardly through the bottom of the tailgate to sweep the refuse forwardly into the body of the vehicle.

7 Claims, 8 Drawing Figures

PATENTED APR 17 1973 3,727,779
SHEET 1 OF 3
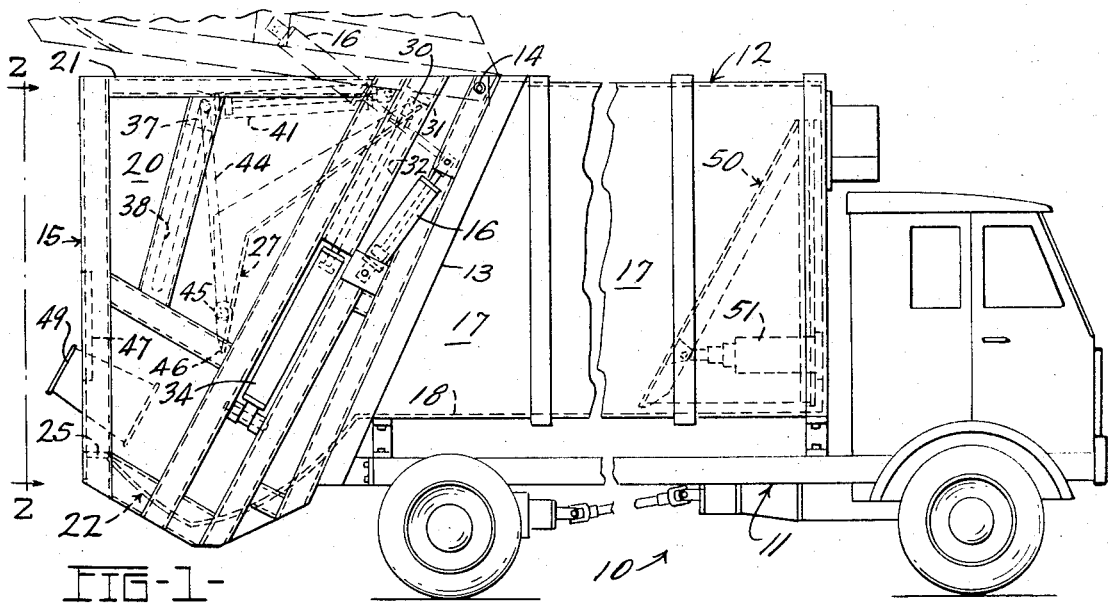
FIG-1-
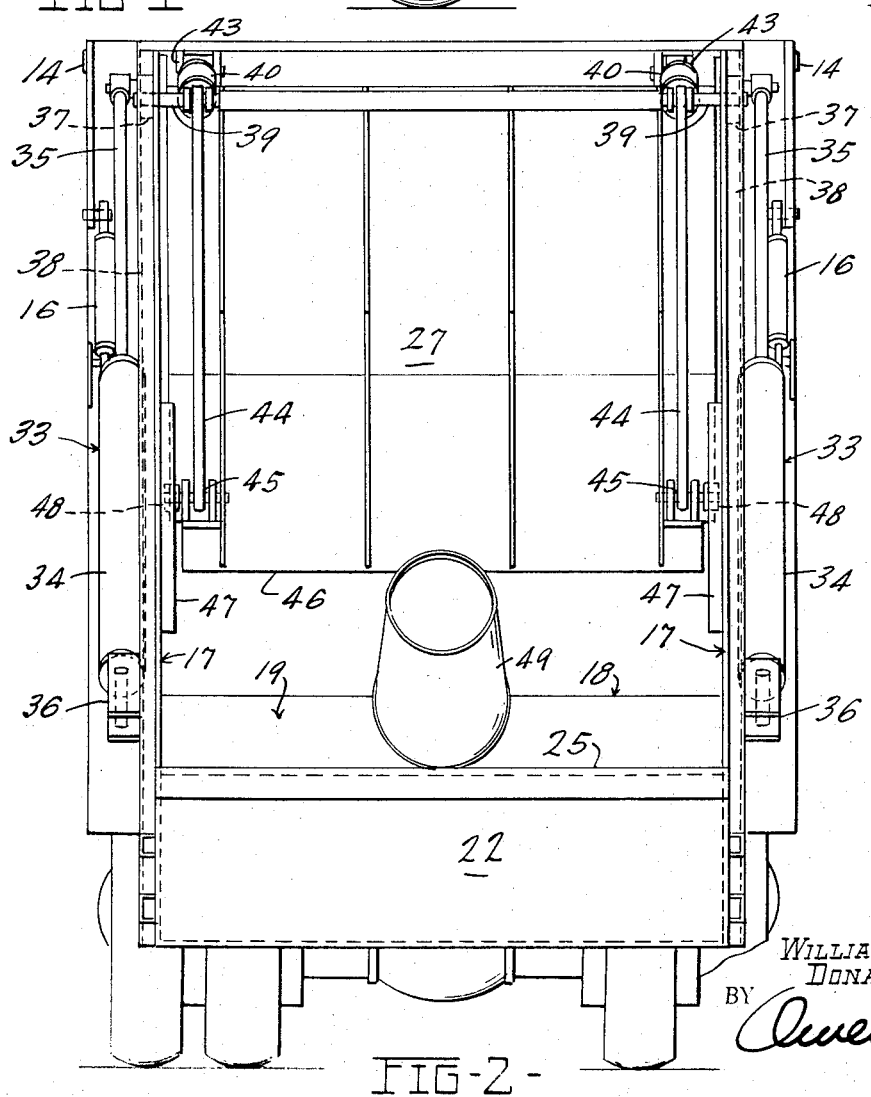
FIG-2-
INVENTORS:
WILLIAM A. HERPICH.
DONAL W. CHANEY.
BY Owen & Owen
ATT'YS.

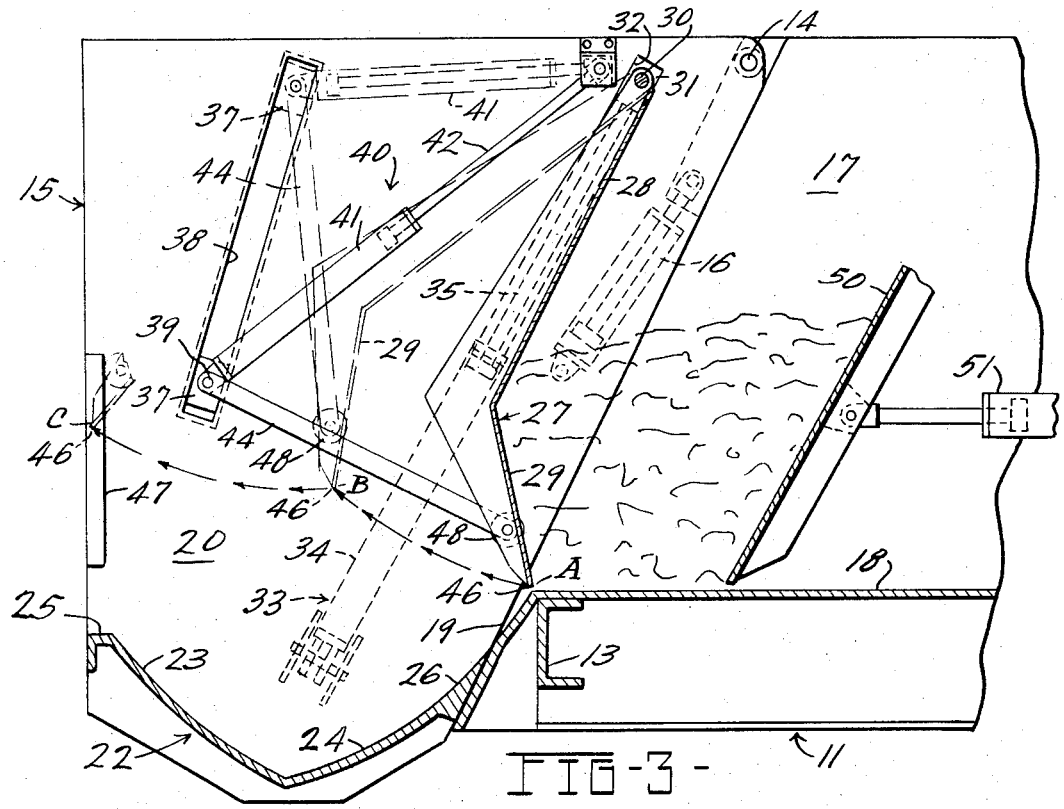
FIG-3-
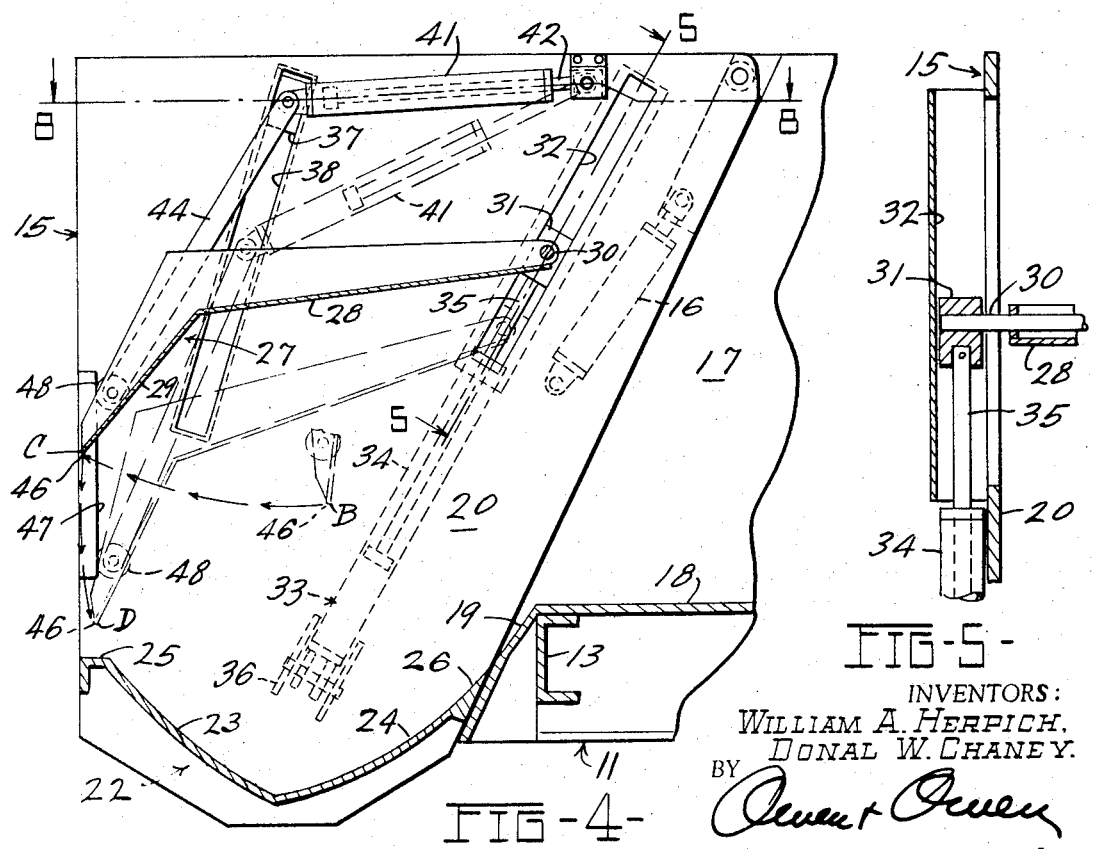
FIG-4-
FIG-5-
INVENTORS:
WILLIAM A. HERPICH.
DONAL W. CHANEY.
BY Owen + Owen
ATT'YS.

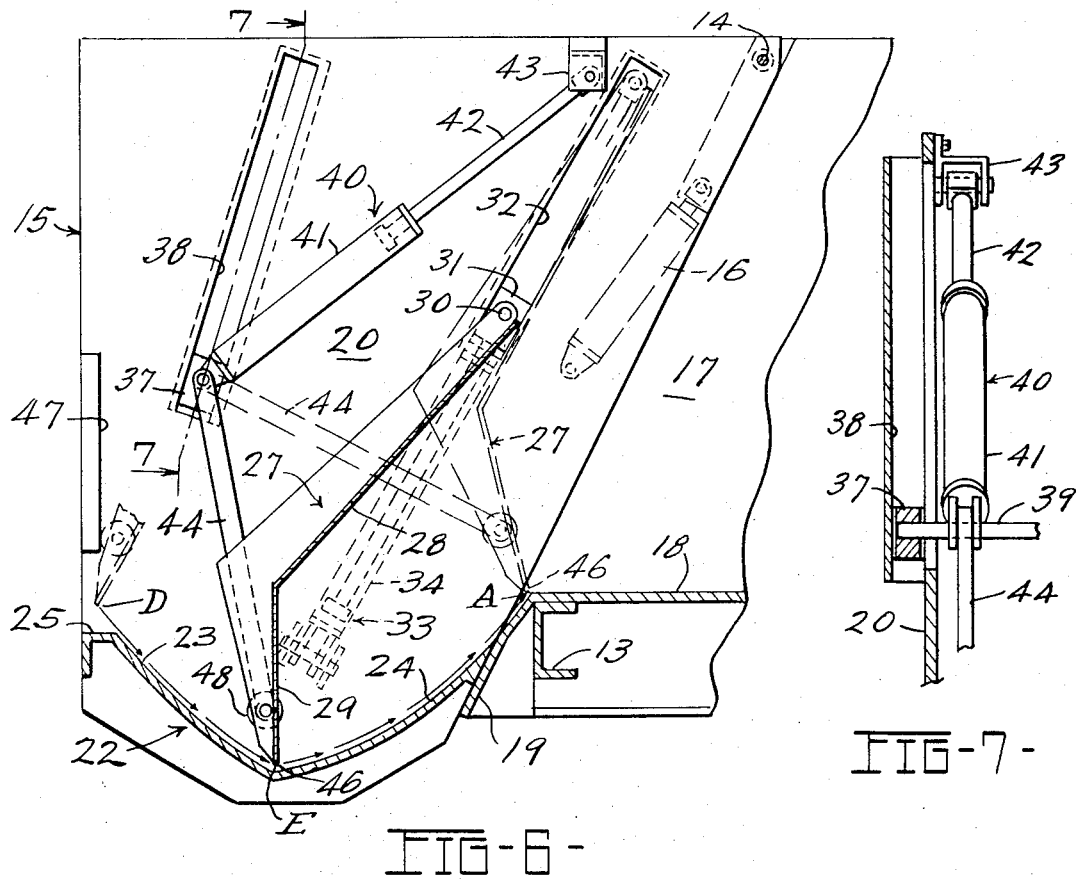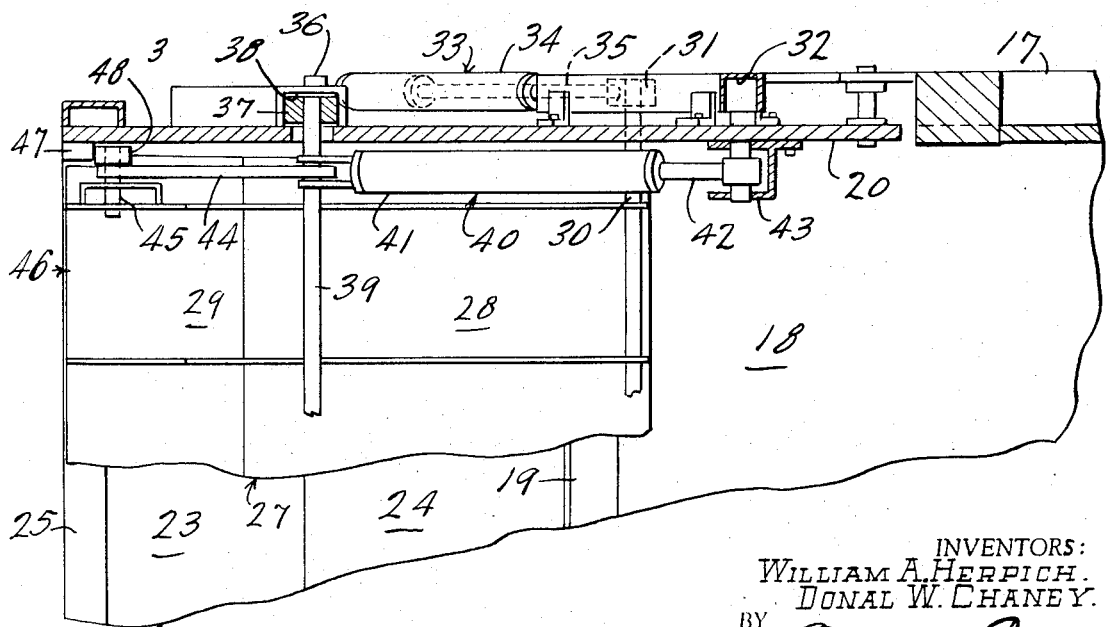

REAR LOADING REFUSE VEHICLE

BACKGROUND OF THE INVENTION

One of the most popular general types of refuse collecting vehicle is the type designated as a "rear loader." Vehicles of this type have a generally rectangular elongated body which is carried on a heavy truck chassis and into which the refuse is to be packed for transportation to a central collecting station or a dump. A vehicle of this type also has a tailgate which comprises a hopper into which refuse can be emptied, for example, from domestic refuse cans. A tailgate of this type also has mechanism by which a packer blade is moved through the tailgate to transfer the refuse from the collecting hopper at the bottom of the tailgate into the rear end of the body. Some of these trucks are designed so that the tailgates are elevated and the body tilted to empty the refuse; in others the tailgate is elevated and the refuse ejected from the body by an ejector panel which is moved longitudinally through the body.

While this general type of refuse collecting vehicle is well known, problems always exist in the design of the power mechanism by which the packer blade is moved rearwardly over a quantity of refuse collected in the hopper and then forwardly to move the refuse out of the hopper and into the body of the vehicle. It is desirable that this mechanism not only merely move the refuse from the hopper into the body but also, if possible, that the mechanism be so designed as to pre-compact refuse and to force it into the body with sufficient power so that the accumulating refuse in the body is densified or compacted. For examples, cardboard cartons when in their ordinary shape occupy considerable volume but if crushed occupy a very small fraction of the same volume.

The problems in achieving pre-compaction, i.e., in partially compacting the refuse as it is moved out of the hopper and before it is moved forwardly into the body of the truck are considerable. The mechanism which moves the packer blade must not only sweep the hopper clean but, by reason of its design, should be able to achieve a substantial degree of pre-compaction in the tailgate before moving the refuse into the body of the truck. If the refuse is not thus pre-compacted, it becomes extremely difficult to achieve any solidification or compaction of the refuse in the body of the truck by reason of the substantial volume of the truck body and the resiliency of the refuse as it is forced into the truck body.

It is therefore the principal object of the instant invention to provide a refuse packing mechanism for a rear loading refuse vehicle which is so designed as to accomplish a substantial pre-compaction of the refuse prior to its being moved from the tailgate of the truck into the body of the truck.

It is yet another important object of the instant invention to provide refuse packing mechanism for the elevating tailgate of a rear loading refuse vehicle in which the mechanism provides mechanical advantage for pre-compaction of the refuse against a part of the wall of the collecting hopper itself so as to pre-compact the refuse in the hopper to a degree in excess of that previously achieved.

BRIEF DESCRIPTION OF THE DRAWINGS

FIG. 1 is a fragmentary view in side elevation of a refuse vehicle equipped with an elevating tailgate comprising a refuse packing mechanism embodying the invention, some parts broken away and some parts being shown in phantom;

FIG. 2 is a rear view in elevation taken from the position indicated by the line 2—2 of FIG. 1 and shown on an enlarged scale;

FIG. 3 is a vertical, sectional, longitudinal view through a portion of the vehicle body and of a tailgate equipped with refuse packing mechanism embodying the invention, the mechanism being shown in its forward inactive position in solid lines and in a first, upper rear position in broken lines;

FIG. 4 is a view similar to FIG. 3 but showing the mechanism in its uppermost and most rearward position in solid lines and in a lower rearward position in phantom;

FIG. 5 is a fragmentary, sectional view taken along the line 5—5 of FIG. 4 and shown on an enlarged scale;

FIG. 6 is a view similar to FIGS. 3 and 4 but showing the mechanism with the packer blade at the bottom of the loading hopper in solid lines and again illustrated in its most forward position in phantom;

FIG. 7 is a fragmentary, sectional view taken along the line 7—7 of FIG. 6 and shown on an enlarged scale; and FIG. 8 is a fragmentary, horizontal, sectional view taken along the line 8—8 of FIG. 4.

DESCRIPTION OF A PREFERRED EMBODIMENT

A refuse collecting vehicle generally indicated by the reference number 10 comprises a truck chassis 11 on which is mounted a rectangular, elongated body 12. At its rear open end, the body 12 has a perimeter frame 13 at the top of which are mounted heavy pivot pins 14, or the like, for pivoting a tailgate generally indicated by the reference number 15. Hydraulic cylinders 16 are connected between the frame 13 and the tailgate 15 in order to swing the tailgate 15 upwardly into unloading position as shown in broken lines in FIG. 1. The body 12 has vertical side walls 17 and a floor 18. At the rear of the floor 18 there is a downwardly and rearwardly inclined body apron 19.

The tailgate 15 has general vertical extending side walls 20, a top 21, and a bottom hopper 22. The hopper 22 is formed by two curved portions, a rear portion 23 and a front portion 24. The rear edge of the rear curved portion 23 of the hopper 22 is defined by a sill 25. The front end of the front curved portion 24 of the hopper 22 is defined by a cross member 26 which continues the curvature of the portion 24 and blends into the surface of the body apron 19 so that the body apron 19 constitutes a continuation of the hopper portion 24 when the tailgate 15 is in loading position as illustrated, particularly, in FIGS. 3, 4, and 6.

A packer blade generally indicated by the reference number 27 is generally L-shaped in vertical cross section and comprises a longer, upper arm 28 and a lower shorter arm 29. The upper end of the packer blade arm 28 is pivotally connected by horizontal pins 30, or the like, to a pair of slide blocks 31, each of which is movable along an inclined guide track 32 on the respective side wall 20.

The slide blocks 31 are reciprocated in their guide tracks 32 by a pair of hydraulic cylinder and piston sets 33, in this embodiment, comprising a cylinder 34 and a rod 35. Each of the cylinders 34 is pivotally mounted at its lower end by a clevis 36 supported on the exterior of the respective side wall 20. Each of the rods 35 is pivotally connected at its upper end to the respective one of the slide blocks 31. Thus by extending and retracting the piston rods 35 their associated slide blocks 31 are moved back and forth along the inclined guide track 32 and, through the pivot pins 30, move the upper end of the packer blade 27 along the path defined by the guide tracks 32.

A substantially similar pair of slide blocks 37 are movable up and down along a second pair of guide tracks 38 also located on the side walls 20 but rearwardly of the first guide tracks 32 although they extend generally in the same direction. The second slide blocks 37 are pivotally connected by massive pins or rods 39, or the like, to the lower ends of a second set of cylinders and pistons 40, in this embodiment comprising cylinders 41 which are attached to the pins 39 at their lower ends and rods 42 mounted at their upper ends in yokes 43 carried by the tailgate side walls 20.

The lower ends of the second cylinder sets 40 are also mechanically connected to thrust links 44 which are carried by the pivot pins or rods 39 at their upper ends and which are pivotally connected at their other ends by suitable pivots 45 to the lower arm 29 of the packer blade 27. The links 44 are connected on opposite sides of the packer blade arm 29 at a location between its lower trailing edge 46 and the apex of the two arms 28 and 29. The precise point of connection of the lower ends of the links 44 to the packer blade 27 is determined by considerations of mechanical advantage, the shape of the hopper 22, precise inclination of the two sets of guide tracks 32 and 38 and the degree of pre-compaction desired as refuse dumped into the hopper 22 is forced forwardly by the packer blade 27.

A vertically extending guide bar 47 is mounted at each side of the tailgate at a location just above the sill 25 for engagement by a guide roller 48 (see FIG. 4) which is shown as being mounted on the same pivot pins 45 to which the links 44 are connected and which connect the links 44 to the packer blade 27.

OPERATION

Assuming that a sufficient number of domestic or other refuse containers, such as a can generally indicated by the reference number 49 (FIGS. 1 and 2) have been emptied over the sill 25 into the collecting hopper 22 so that it is necessary to move the accumulated refuse out of the hopper 22, one of the workmen actuates controls (not shown) for the sets of hydraulic cylinders and pistons 33 and 40. The controls are so designed that power is applied to provide the following sequence of operation:

1. The packer blade 27 is illustrated in FIG. 3 as being at its foremost, body-closing position where it stays during the time when workers are loading refuse into the hopper 22. In this position the upper end of the packer blade 27 is at the top of the tracks 32 and the trailing edge 46 of the packer blade 27 is at the upper end of the body apron 19. At this time, the rear slide blocks 37 are at the lower ends of their guide tracks 32 and the second set of cylinder and piston 40 is extended. This situation is indicated by the Position "A" in solid lines in FIG. 3.

Power is then applied to the second set of cylinders and pistons 40 to retract their rods 42 which pulls the slide blocks 37 upwardly along the tracks 38 and, through the links 44 swings the trailing edge 46 of the packer blade 27 backwardly and upwardly along the path "A-B" shown in FIG. 3 until the trailing edge 46 of the packer blade 27 reaches Position "B" upon complete retraction of the rods 42 into their cylinders 40.

2. Upon completion of the retraction of the cylinder sets 40, the control mechanism is actuated to retract the rods 35 of the first cylinder and piston sets 33 which swings the packer blade 27 from Position B backwardly along the path "B-C," shown in FIG. 4, until the rollers 48 carried by the packer blade 27 engage the guide bars 47. At this point the trailing edge 46 of the packer blade 27 is positioned above the hopper sill 25 and at its rearmost position within the tailgate 15. This position is shown in solid lines in FIG. 4 and indicated therein as Position C.

3. Upon engagement of the rollers 48 with the bars 47, further rearward movement of the packer blade 27 is stopped and the increase in pressure in the cylinders 34 results in switching the control mechanism to apply power to both the first cylinders 34 and the second cylinders 41. This extends the piston rods 44 and further retracts the rods 35 moving the trailing edge 46 of the packer blade 27 downwardly along the guide bars 47 until the trailing edge 46 of the packer blade 27 has reached Position "D" shown in broken lines in FIG. 4.

Movement from Position C to Position D thrusts the trailing edge 46 of the packer blade downwardly to the limits of its travel adjacent the sill 25 with sufficient power to fracture or crush relatively heavy items which may be protruding from the hopper 22 outwardly over the sill 25. In addition, should the item protruding outwardly be too strong to be broken by the downward movement of the edge 46, the extreme resistance to further movement and a sharp increase in pressure in the cylinders 41 signals the control mechanism to lift the trailing edge 46 upwardly. If desired, appropriate valving can also be present in the control mechanism so that upon such a reaction, the mechanism is stopped so that the operator may remove the item which caused the jam.

4. If, on the contrary, there is no obstruction to the movement of the trailing edge 46 from Position C to Position D, i.e., if the movement is natural and no jam occurs, continued extension of the rods 42 of the pistons sets 40 and retraction of the rods 35 results in moving the leading edge 46 of the packer blade 27 downwardly to Position D. At Position D the rods 35 of the first cylinders 34 are completely retracted so that the hydraulic fluid continues to flow to the second cylinders 41 to continue extending their rods 42.

The curvature of the rear portion 23 of the hopper 22 is thus defined by the curve through which the trailing edge 46 of the packer blade 27 is moved while travelling from Position D to Position "E." This curve is defined by the pivotal connection of the upper end of the packer blade 27 to the first slide blocks 31 at the lower ends of their tracks 32 as it is moved downwardly by the connecting link 44 during the last portion of the downward movement of the slide blocks 37.

During this movement from Position D to Position E refuse accumulated in the hopper 22 is swept forwardly in the hopper 22.

5. Movement of the trailing edge 46 along the path "C-D" is effected by continued extension of the rods 42 swings the packer blade 27 downwardly and forwardly around the pivot pins 30 in the first slide blocks 31. This sweeps the trailing edge 46 along the surface of the rear hopper portion 23.

6. The final increment of movement of the trailing edge 46 of the packer blade 27 and of the packer blade 27, itself, is from Position E shown in solid lines in FIG. 6 to its original Position A shown in broken lines in FIG. 6 and in solid lines in FIG. 3.

This movement from Position E to Position A is accomplished by the extension of the rods 35 of the first cylinder sets 33 from their most retracted position to their most extended position and the consequent movement of the slide blocks 31 from the lower ends of their tracks 32 to the upper ends of their tracks 32. This movement through the path "E-A" has a considerable component of horizontal movement by reason of the connection of the links 44 which are pivoted around the slide blocks 37 at this time. Refuse accumulated at the front side of the packer blade 27 is substantially pre-compacted by the lower arm 29 of the packer blade 27 against the forward portion 24 of the hopper 22 and the apron 19 of the body.

The shape of the surface of the forward portion 24 and the body apron 29 is determined by the path of movement of the trailing edge 46 of the packer blade 27 en route from Position E to Position A. This compound curve results from the travel of the upper end of the packer blade 27 along the guide track 32 with the simultaneous swinging of the links 44 around their pivots on the slide blocks 37. When the packer blade 27 reaches Position A its cycle of operation is completed and the arrival of the first cylinder rods 35 at full extension signals the control mechanism to terminate that excursion.

Subsequent loading of refuse into the hopper 22 followed by packing excursions as described above eventually pre-compacts a sufficient quantity of refuse and pushes it forwardly into the body 12 so as to fill the body 12. Frequency in a rear loading refuse vehicle of the type herein generally described, the body 12 is provided with an interior ejector plate shown in phantom in FIG. 1 and indicated by the reference number 50 so that after the tailgate 15 has been swung upwardly to open position (broken lines FIG. 1) a hydraulic cylinder 51 or similar mechanism is actuated to traverse the ejector plate 50 rearwardly through the body 12 for ejecting the load.

In a rear loading vehicle equipped with a tailgate having refuse packing mechanism embodying the invention, it may also be desirable to so control the hydraulic cylinder 51 that the ejector 50 is located near the rear of the body 12 when the body 12 is empty and is gradually moved forward through the body 12 as refuse accumulates in the body 12. The ejector 50 thus functioning as a "base plate" against which the powerfully actuated packer blade 27 of the invention can compress refuse. For this reason, the ejector plate 50 is shown in such a rearward position in FIG. 3 and a mass of refuse is shown as being compacted between the packer blade 27, and particularly its lower arm 29, and the face of the ejector plate 50.

What We Claim Is:

1. Refuse packing mechanism for a rear loading refuse vehicle that has a body and a tailgate that is pivoted at its upper front corner to the upper rear end of the body, said tailgate having spaced vertical side walls, an open rear end, and a hopper-like bottom, said refuse packing mechanism comprising,
   a. a first pair of parallel guide tracks on said side walls, said tracks extending downwardly and rearwardly from near the upper front corners of said side walls,
   b. a packer blade extending across said tailgate and adapted to be swept back and forth in said tailgate, said packer blade having an upper end and a lower trailing edge,
   c. first pivot means mounting the upper end of said packer blade and reciprocable along said first guide tracks,
   d. first power means for reciprocating said first pivot means along said first guide tracks,
   e. a second pair of parallel guide tracks on said side walls extending in the same general direction as said first pair of guide tracks and spaced rearwardly therefrom,
   f. second pivot means reciprocable along said second guide tracks,
   g. second power means for reciprocating said second pivot means along said second tracks,
   h. and a pair of thrust links, each of said links being pivotally connected at its first end to one of said second pivot means and pivotally connected at its other end to said packer blade near its trailing edge.

2. Refuse packing mechanism according to claim 1 in which first and second power means are lineally extensible fluid actuated cylinders and pistons.

3. Refuse packing mechanism according to claim 2 in which the first power means are located on the exteriors of said vertical side walls and extend along the first guide tracks with their lower ends mounted by said side walls and their upper ends connected to the respective ones of the first pivot means.

4. Refuse packing mechanism according to claim 2 in which the second power means are located within the upper portion of the tailgate with their forward ends pivotally carried by the upper portions of the side walls and their other ends are connected to the second pivot means and the first ends of the thrust links.

5. Refuse packing mechanism according to claim 1 in which the packer blade is approximately L-shaped, the longer arm thereof extends toward the upper end and the thrust links are connected thereto between the apex of the arms and the lower trailing edge.

6. Refuse packing means according to claim 1 in which the first and second pivot means are slide blocks engaged in and movable along the respective ones of the guide tracks.

7. A rear loading refuse vehicle having refuse packing mechanism according to claim 2 in which the hopper-like bottom of the tailgate has two major portions meeting in a generally V-shaped longitudinal section, each portion of such section being a curve defined by the path of movement of the trailing edge of the packer blade described upon sequential substantially complete extension of the first and second power means.

* * * * *